United States Patent
Wagenhuber et al.

(10) Patent No.: US 8,442,728 B2
(45) Date of Patent: May 14, 2013

(54) CONTROL DEVICE FOR A VEHICLE HAVING AN AUTOMATICALLY OPENING AND/OR AUTOMATICALLY CLOSING FLAP

(75) Inventors: Josef Wagenhuber, Gerolsbach (DE); Juergen Mayr, Munich (DE); Dirk Sauer, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/556,841

(22) Filed: Jul. 24, 2012

(65) Prior Publication Data
US 2012/0290177 A1 Nov. 15, 2012

Related U.S. Application Data

(63) Continuation of application No. PCT/EP2011/051072, filed on Jan. 26, 2011.

(30) Foreign Application Priority Data

Jan. 29, 2010 (DE) .................. 10 2010 006 213

(51) Int. Cl.
*G06F 7/00* (2006.01)
(52) U.S. Cl.
USPC .......................................... 701/49; 340/5.72
(58) Field of Classification Search ............ 701/49, 701/36; 340/5.72, 5.28, 5.61, 5.62, 5.64, 340/426.28, 426.29, 426.36, 426.3, 435, 340/522, 523, 12.28, 12.22–12.24; 49/26–28
See application file for complete search history.

(56) References Cited

U.S. PATENT DOCUMENTS

| | | | |
|---|---|---|---|
| 6,034,617 A * | 3/2000 | Luebke et al. | 340/5.62 |
| 6,279,626 B1 * | 8/2001 | Schmitt et al. | 141/348 |
| 6,924,735 B2 * | 8/2005 | Ueda et al. | 340/426.28 |
| 2003/0146820 A1 * | 8/2003 | Takamura et al. | 340/5.28 |
| 2003/0216817 A1 * | 11/2003 | Pudney | 700/17 |
| 2007/0146120 A1 | 6/2007 | Kachouh | |
| 2007/0205863 A1 | 9/2007 | Eberhard | |

FOREIGN PATENT DOCUMENTS

| | | |
|---|---|---|
| DE | 195 33 804 A1 | 3/1996 |
| DE | 100 56 569 A1 | 5/2002 |
| DE | 10 2004 041 709 B3 | 10/2005 |
| DE | 20 2005 020 149 U1 | 6/2007 |

OTHER PUBLICATIONS

"Betriebsanleitung zum Fahrzeug", Operating Instructions concerning the BMW 5-Series, Year 2002, Order No. 01 40 0 156 808, pp. 34-36.
International Search Report dated May 16, 2011 with English translation (four (4) pages).
German Search Report dated Apr. 6, 2010 with partial English translation (nine (9) pages).

\* cited by examiner

*Primary Examiner* — Marthe Marc-Coleman
(74) *Attorney, Agent, or Firm* — Crowell & Moring LLP

(57) ABSTRACT

A vehicle control system for an automatically opening and/or automatically closing flap, includes a programmable operating switch and a programmable electronic control device. The operating switch is a proximity sensor that is actuatable in a non-contact manner and, after the actuation occurs, generates an operation request signal as an input signal to the control device. In the presence of the operation request signal and, as required, of at least one further condition, the control device emits a command to a closing mechanism for opening or closing the flap. The control device and/or the operating switch is programmed such that the operation request signals are counted as long as at least a first defined condition has not yet been met, and that, when a defined maximal counter reading has been reached, the operation request signals will be ignored until at least a second defined condition has been met.

8 Claims, 2 Drawing Sheets

US 8,442,728 B2

CONTROL DEVICE FOR A VEHICLE HAVING AN AUTOMATICALLY OPENING AND/OR AUTOMATICALLY CLOSING FLAP

CROSS REFERENCE TO RELATED APPLICATIONS

This application is a continuation of PCT International Application No. PCT/EP2011/051072, filed Jan. 26, 2011, which claims priority under 35 U.S.C. §119 from German Patent Application No. 10 2010 006 213.8, filed Jan. 29, 2010, the entire disclosures of which are herein expressly incorporated by reference.

BACKGROUND AND SUMMARY OF THE INVENTION

The invention relates to a control system for a vehicle having an automatically opening and/or automatically closing flap which has at least one programmable operating switch and a programmable electronic control device. The operating switch, in the form of a proximity sensor is to be actuated in an arbitrarily non-contact manner and, after the actuation has taken place, generates an operation request signal which is the input signal of the control device.

In connection with a vehicle having at least one automatically opening flap, such a control system is known from German Patent document DE 10 2004 041 709 B3.

Furthermore, a motor vehicle having a self-opening flap that can be activated by remote control is described in the assignee's vehicle program (see, for example, the Operating Instructions concerning the BMW 5-Series, Year 2002, Order Number 01 40 0 156 808, Pages 34-36). In this case, the operator can manually initiate an opening command for the flap by pressing a key on the remote control, which flap will then automatically open completely.

It is an object of the invention to further develop a control system of the above-mentioned type such that the power consumption of the concerned electric and electric vehicle components is reduced.

According to the invention, this and other objects are achieved by a control system for a vehicle having an automatically opening and/or automatically closing flap, which has at least one programmable operating switch and a programmable electronic control device, wherein the operating switch is to be actuated in an arbitrarily non-contact manner in the form of a proximity sensor and, after the actuation has taken place, generates an operation request signal which is the input signal of the control device. The control device is programmed such that, in the event of a presence of the operation request signal and, as required, of at least one further condition, the control device emits a swiveling command to a closing mechanism for the opening or closing of the flap. Furthermore, the control device and/or the operating switch or proximity sensors are programmed such that the operation request signals are counted as long as at least a first defined condition has not yet been met, and that, when a defined maximal counter reading has been reached, the operation request signals will be ignored until at least a second defined condition has been met.

The invention is based on the consideration that, in the case of a vehicle having an automatic flap control, measures against misuse should be provided by way of a non-contact proximity sensor that is mounted on the vehicle and is freely accessible for everyone. First, a flap must not be automatically opened or closed immediately in the case of each actuation of the proximity sensor. Secondly, when a vehicle is parked, current should not unnecessarily be consumed by an activating of systems. A so-called child proofing is therefore created by means of the invention, which, in the event of a too frequent and obviously unnecessary actuating of the proximity sensor, deactivates the electric or electronic components affected by the related function. Preferably, the proximity sensor is more likely to be programmed in the manner according to the invention instead of the control device, because the proximity sensor consumes less current than the control device. For example, also the checking of the access authorization stimulates several additional consuming devices, which can be switched off again when the maximal counter reading has been reached. The invention therefore primarily ensures the minimization of the power consumption when the vehicle is parked or the internal-combustion engine is switched off. The output of the swiveling command from the control device for the actual opening or closing of a flap can also be prevented for child proofing.

Other objects, advantages and novel features of the present invention will become apparent from the following detailed description of one or more preferred embodiments when considered in conjunction with the accompanying drawings.

DETAILED DESCRIPTION OF THE PREFERRED EMBODIMENTS

Figure 1:
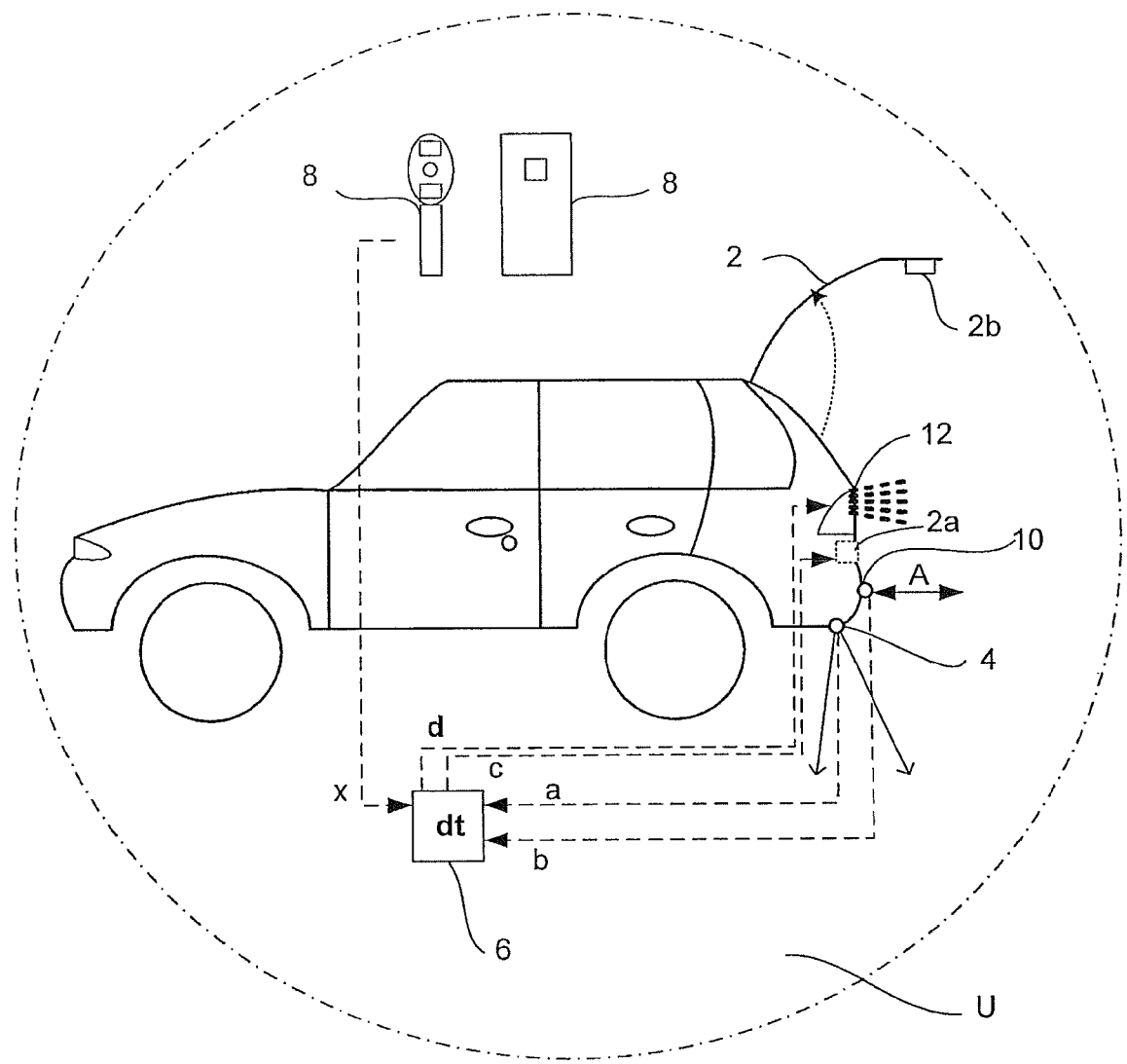
FIG. 1 is a schematic view of a motor vehicle having a flap that opens automatically as a result of an opening command, and having a proximity sensor and a control device provided according to an embodiment of the invention.

In the illustrated embodiment according to FIG. 1, the flap 2 is constructed as a hatchback flap of a motor vehicle. Starting from a closed condition of the hatchback flap 2, the automatic opening of the flap 2 is initiated by an opening command in the from of a control signal c of a programmable control device 6 to a locking and unlocking mechanism 2a, 2b. The hatchback flap 2 will then be moved to an opened position either as a result of a spring bias or as a result of an activated (for example, electric, hydraulic or pneumatic) motor function. In this case, the flap 2 is preferably automatically opened over its entire opening path or up to a maximally permitted opening path. The maximally permitted opening path can be predefined by way of a system according to German Patent document DE 100 56 569 A1 or German Patent document DE 195 33 804 A1.

In addition, the motor vehicle includes at least one, but preferably two, proximity sensor(s) 4, which is (are) operatively connected with the control device 6. For the purpose of simplification, only one proximity sensor 4 will be mentioned in the following. The proximity sensor 4 is a programmable operating switch which should be actuated in an arbitrarily non-contact manner. After the actuation has taken place, it generates an operation request signal a, which is guided as an input signal to the control device 6.

The control device 6 and the proximity sensor 4 are either separate programmable cooperating modules or are integrated in a single electronic programmable module. The inventive aspects can be implemented in the form of a program, hardware, or in the form of program parts in each module. Preferably, separate modules are used, in which case a comparatively simple electronic module is used as the proximity sensor 4, which electronic module consumes as little electric power as possible in the activated condition and receives the signals required from the control device 6.

The control device 6 is preferably constructed such that not only the presence of the operation request signal a is monitored but also additional defined conditions, before it emits a control signal c—here, for the opening of the hatchback flap 2. Such an additional defined condition is, for example, the additional presence of a defined vehicle condition signal x, by which, for example, an unauthorized vehicle start can be excluded. Such a condition signal x can, for example, be an unlocked condition signal of the central locking system or a recognition signal concerning the presence of an access authorization device 8 in the locked condition. For the second alternative, it is checked, for example, while integrating the control device 6, whether an access authorization device is present (as a rule, a user who is carrying a remote key or a card key) within a predefined area U around the vehicle. Such monitoring devices are known.

A further defined condition may, for example, also be the recognition of a signal b of a distance detection system 10 (for example, the sensors of a Park Distance Control (PDC) system), which is always generated by the distance detection system 10 when an object (for example, a leg) is within a predefined distance from a distance sensor. Preferably, the proximity sensor 4 is arranged in the proximity of the distance detection system 10 in such a manner that a certain detailed approach pattern of an object can be recognized. The signal b is then also an input signal of the control device 6.

The at least one proximity sensor 4 is preferably arranged such that a user can cause it to switch or can switch it by swiveling one's foot in the area between the vehicle body and the road surface. In particular, the proximity sensor 4 is arranged below a bumper 12 or on the bottom side of a bumper 12 in a manner integrated in the latter.

If the operation request signal a and preferably, in addition, signals x and/or b are present in the control device 6, the control device 6 first optionally activates a confirmation signal d. Here, for example, the confirmation signal d is a one-time visual flashing of the emergency flasher system 12. Subsequently, by the control signal c, the control device 6 activates the unlocking/locking mechanism 2a, 2b for the release of the automatically opening flap 2, for example, delayed by a predefined time dt after the emission of the confirmation signal d or of the operation request signal a.

Figure 2:
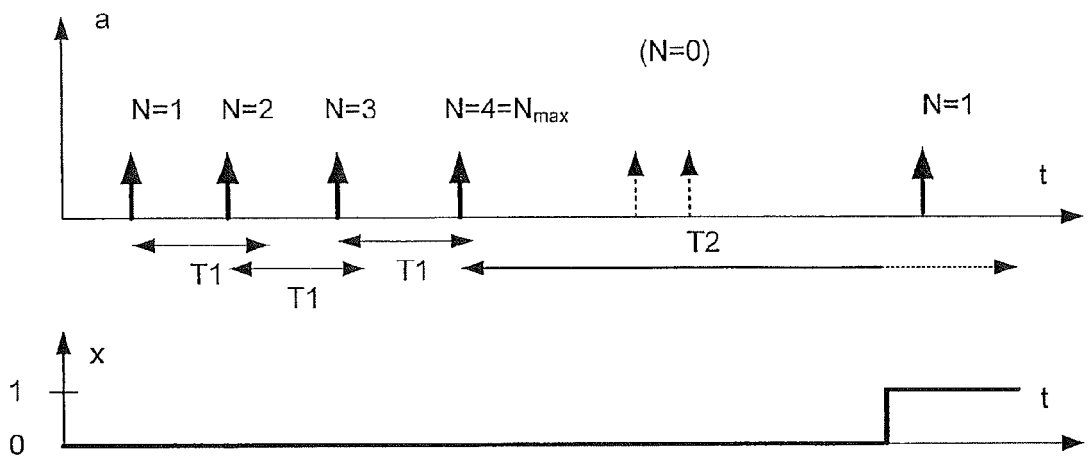
FIGS. 2 and 3 are views of exemplary signal sequences according to the invention.

By means of FIGS. 2 and 3, the further development of the control device or of the proximity sensor will be explained by means of exemplary signal sequences.

Here, the proximity sensor 4 (FIG. 1) is preferably generally switched on when the vehicle is in a stopped condition and is programmed such that the operation request signals a are counted as long as at least a first defined condition has not yet been met, and that, when a defined maximal counter reading $N_{max}$ has been reached, the operation request signals a are ignored (for example, their detection or analysis is stopped), until at least a second defined condition has been met. The counter reading will then be set back: N=0.

A first defined condition preferably is the absence of an operation request signal a during a first predefined time period T1 from the occurrence of a previous operation request signal a. In addition or as an alternative, a first defined condition is the presence of a defined condition signal x of the vehicle closing system (x=1), as, for example, the presence of an access authorization device, the unlocked state of the central locking system or the flap condition to be changed.

The, or a second, defined condition preferably is the course of a second predefined time period T2 or the presence of a defined condition signal x of the vehicle closing system (x=1) or the start of an internal-combustion engine.

The, or a second, defined condition may be equal to the first defined condition. Particularly, the presence of the defined condition signal x(x=1) is suitable for this purpose.

The proximity sensor 4 is programmed such that, during the course of the first defined time period T1 starting from the occurrence of an operation request signal a, as long as at least a first defined condition—for example, x=1—has not yet been met, it is checked whether an additional operation request signal a is occurring, and if this is so, that the counter reading N is increased, and the first defined time period T1 is restarted until the maximal defined counter reading $N_{max}$ has been reached. In the illustrated embodiment according to FIG. 2, $N_{max}=4$.

The proximity sensor 4 is further programmed such that, starting with the reaching of the maximal defined counter reading $N_{max}$, the analysis of the operation request signal a is stopped and the counter reading N is set back (N=0) until the, or a, defined condition has been met. In FIG. 2, the occurrence of the defined condition signal x (here, x=1), as the second defined condition, has the result that the operation request signal a is detected and analyzed again. If, in the embodiment according to FIG. 2, x were to remain equal to 0, the course of the defined second time period T2, as the second defined condition, starting with the reaching of the maximal counter reading $N_{max}$ would have the result that the operation request signal a will be detected and analyzed again.

Figure 3:
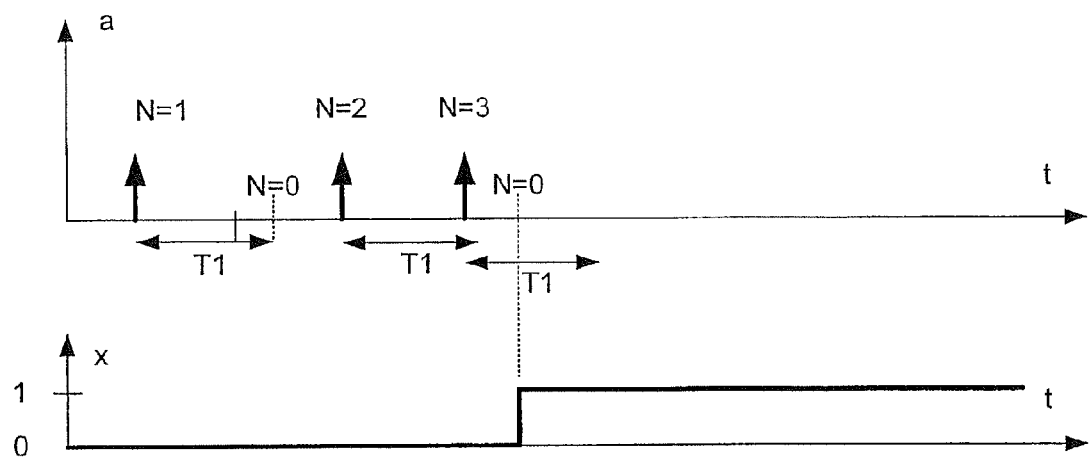

In FIG. 3, after the occurrence of a third operation request signal a (N=3), within the subsequent sequence of the first defined time period T1, a second defined condition is met, specifically the occurrence of the defined condition signal x: x=1. The counter reading will then be set back again (N=0).

The defined time periods T1 and T2 may be variable parameters. The setting back of the counter N(N=0) can generally also be used as a switch-off command of the "child-proofing" according to the invention. A range of from 1 to 15 seconds was found to be advantageous for the first defined time period T1. A range of from 10 to 150 minutes was found to be advantageous as the second defined time period T2.

In a supplementary fashion, it is pointed out that an automatically opening flap 2 may, for example, be a trunk lid, the hatchback flap, the engine hood, the gas cap, an entrance door or another closing device of a loading, filling or entrance opening of the vehicle.

The invention can also be applied when a flap can be opened automatically as well as closed automatically. In this case, a first defined condition for opening the flap can be the closed condition of the flap, and for closing the flap, the open condition of the flap can be a first defined condition. Particularly for closing the flap, a first defined condition may also be a release signal of an anti-trap device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A control system for a vehicle having an automatically opening and/or closing flap, the control system comprising:
   a programmable electronic control device;
   at least one programmable operating switch, the operating switch being a proximity sensor actuatable in a non-contact manner wherein, after actuation occurs, the operating switch generates an operation request signal as an input signal to the control device;

wherein the control device is operatively programmed such that, in an event of receipt of the operation request signal and, as required, at least one further condition, the control device emits a command for opening or closing the flap;

further wherein at least one of the control device and the operating switch is operatively programmed such that operation request signals are counted as long as at least a first defined condition has not yet been met, and still further wherein when a defined maximal counter reading is reached, the operation request signals will be ignored until at least a second defined condition has been met.

2. The control system according to claim 1, wherein the first defined condition is an absence of the operation request signal during a first predefined time period from an occurrence of a previous operation request signal.

3. The control system according to claim 2, wherein another first defined condition is a presence of a defined condition signal of a vehicle closing system.

4. The control system according to claim 1, wherein the first defined condition is a presence of a defined condition signal of a vehicle closing system.

5. The control system according to claim 1, wherein the second defined condition is a course of a second predefined time period or a presence of a defined condition signal of a vehicle closing system or a start of an internal-combustion engine.

6. The control device according to claim 1, wherein the second defined condition is equal to the first defined condition.

7. The control device according to claim 1, wherein at least one of the control device and the proximity sensor is operatively programmed such that, during a course of a first defined time period starting from an occurrence of the operation request signal, as long as at least a first defined condition has not yet been met, whether an additional operational request signal is occurring is determined and, if the additional operation request signal is occurring, a counter reading is increased, and the first defined time period is restarted until a maximal defined counter reading has been reached.

8. The control system according to claim 1, further comprising a closing mechanism operatively configured to open or close the flap, wherein the command from the control device actuates the closing mechanism.

\* \* \* \* \*